J. B. HELLER.
PROCESS OF RESOLVING EMULSIONS.
APPLICATION FILED AUG. 15, 1921.
1,412,738.
Patented Apr. 11, 1922.
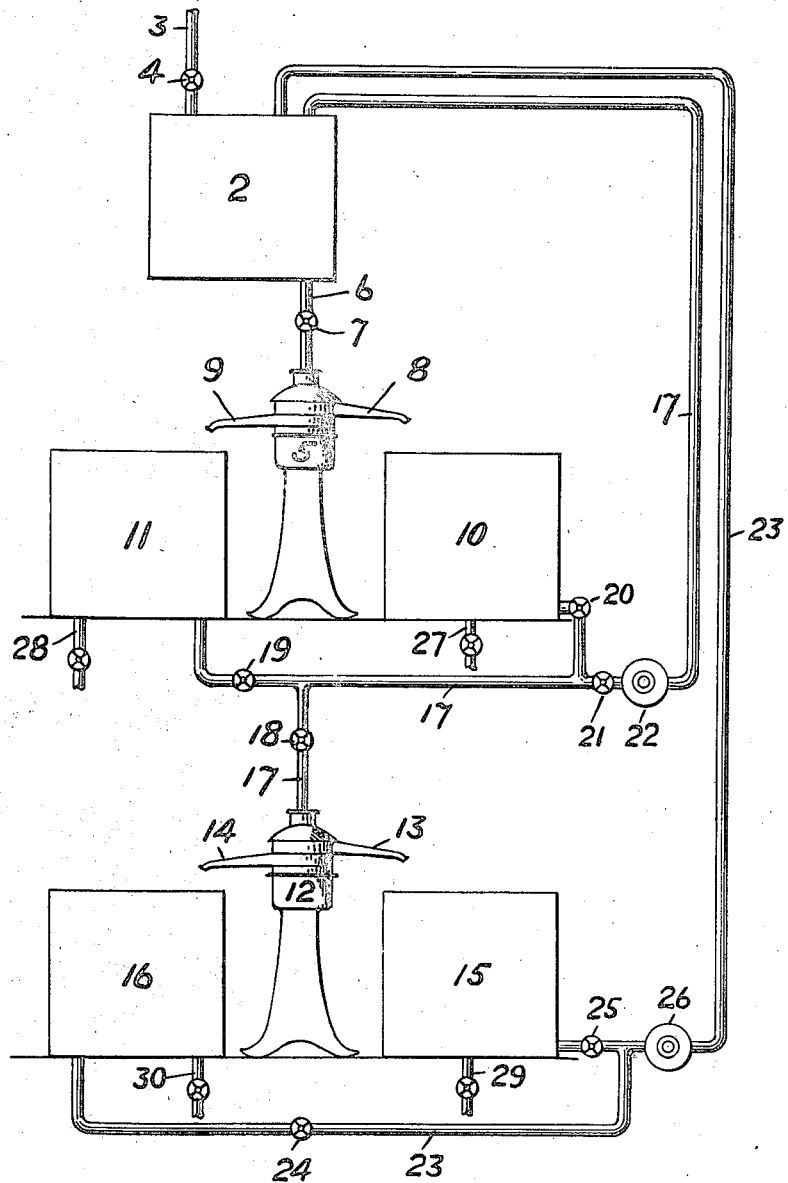
INVENTOR
Jesse B. Heller
BY Frank L Busser
ATTORNEY.
WITNESS:
Rob't R Kitchel

UNITED STATES PATENT OFFICE.

JESSE B. HELLER, OF HADDON HEIGHTS, NEW JERSEY, ASSIGNOR TO THE DE LAVAL SEPARATOR COMPANY, OF NEW YORK, N. Y., A CORPORATION OF NEW JERSEY.

PROCESS OF RESOLVING EMULSIONS.

1,412,738.

Specification of Letters Patent. Patented Apr. 11, 1922.

Application filed August 15, 1921. Serial No. 492,604.

*To all whom it may concern:*

Be it known that I, JESSE B. HELLER, a citizen of the United States, residing at Haddon Heights, county of Camden, and State of New Jersey, have invented a new and useful Improvement in Processes of Resolving Emulsions, of which the following is a full, clear, and exact description, reference being had to the accompanying drawings, which form a part of this specification.

In the centrifugal purification of a liquid that is admixed with another liquid of different specific gravity and especially the resolving of emulsions that resist clean separation, as, for example, in the case of used mineral lubricating oil wherein there is an intimate emulsion of oil and water, the problem of securing an approximately quantitative yield of practically pure liquid is very difficult. It is, and has long been, well understood, that a more nearly perfectly purified liquid can be secured if the outlet for the liquid to be purified is so retarded as to guard against the outflow therewith of the contaminating liquid, but this involves a fairly large proportion of the liquid to be purified escaping from the other outlet with the contaminating liquid. This entails a great loss of the liquid to be purified, or, alternatively, the subjection of the last named mixture of liquids to another separation. In the second separation, however, essentially the same conditions are faced as in the first, and while an additional quantity of purified liquid is recovered, some of it necessarily again escapes with the contaminating liquid. Repeated centrifugal operations are therefore necessary to effect a maximum recovery of the liquid to be purified, but the product of the last centrifugation, and often of all the centrifugations except the first, is rarely pure. In other words, as the proportion of contaminating liquid in the mixture increases, the difficulty increases of extracting, in a pure condition, the liquid to be purified, and the partially purified liquid recovered in the later centrifugations usually requires re-treatment.

In other cases, both of the liquids mixed or emulsed are of value and it is desired to recover both of them in a practically pure state. It is obvious, in such cases, that the difficulties above recited are increased, because while the loss of a certain proportion of either liquid might not be serious, the presence of the lost liquid in the other liquid might be highly undesirable. In other words, where one liquid must be recovered in a pure condition while the other is allowed to go to waste, the loss of a certain proportion of the pure liquid may not be, in some processes, a serious factor, but where both liquids must be recovered in a pure condition, loss of either liquid involves contamination of the other and must be avoided on other grounds than that of economy.

The object of my invention is to practically quantitatively recover either or both liquids from an intimate mixture or emulsion of liquids and to accomplish this result by a continuous process and without the necessity of recentrifuging a large proportion of the total volume of liquid that, in existing processes, requires recentrifuging even to secure a yield inferior in purity and quantity.

My invention is also applicable to those cases where the liquid to be purified, usually the lighter, is admixed with solids as well as another heavier liquid, whether such other liquid is present in the original mixture or is added to sludge the separated solids out of the centrifugal bowl.

Assuming the emulsion to consist of the liquids A and B, I accomplish my object by subjecting the emulsion to centrifugal force and so adjusting the discharge outlet for A as to insure that it will be discharged practically free from B, thereby effecting the discharge from the other outlet of B admixed or emulsified with more or less A. I then centrifuge the latter emulsion by adjusting the outlet for B so as to discharge it practically free from A, thereby effecting the discharge from the other outlet of an emulsion of A and B. I also prefer to so adjust the outlets, in cases where it is possible to do so, that the emulsion of A and B discharged in the second centrifugation will, in proportions of constituents, approximate as nearly as possible the proportions in the original mixture. The discharged emulsion of A and B is then transferred to the supply tank containing the original emulsion of A and B that is being fed to the first centrifuge.

It will be observed that in practicing the foregoing process the seperation in one centrifugal operation of a maximum proportion of either ingredient is not attempted, the purpose of the first operation being to secure A in a pure condition regardless of the amount of A that must be discharged with B, and the purpose of the second operation being to secure B in a pure condition regardless of the amount of B that must be discharged with A. It will also be observed that the process is not necessarily different whether the design is to recover, in a pure condition, either A, or B, or both.

The foregoing description will make it apparent that the process is also applicable to those operations wherein it is desired to eliminate from a liquid an ingredient which is chemically combined therewith or dissolved therein and to which is added a solution of a substance which will combine with or dissolve such contaminating ingredient to form a new solution or compound of different specific gravity from that of the liquid to be purified and immiscible therewith, thereby making its elimination by centrifugal force possible. In fact, the process is applicable to the centrifugal treatment of any mixture or emulsion wherein the heavier ingredient or ingredients flow from the periphery to one discharge outlet while the lighter ingredient or ingredients are displaced inwardly and flow out of another discharge, whether the number of ingredients capable of separation is two or more, and whether the mixture or emulsion to be treated is in a natural condition or in a condition produced by incidental or deliberate pre-treatment.

The foregoing description may suffice to enable one skilled in the art to practice my process, but I deem it advisable to illustrate diagrammatically an apparatus in which the process may be carried out and to describe several different ways of operating the apparatus to carry out the process either continuously or in batch. The single figure is a diagram of such an apparatus. It will be understood, however, that the process is not dependent for its execution upon any particular form of apparatus, and that even the apparatus shown would be used practically with known refinements as to automatic feed, etc., which those skilled in the art would naturally utilize without special instructions.

2 designates a holder for the original mixture to be separated and may be delivered thereto through a pipe 3, having a control valve 4. 5 is a centrifugal separator to which the liquid is delivered from the holder through a pipe 6 having a valve 7 for controlling the flow from the holder 2. 8 is the outlet pipe for the light liquid and 9 the outlet for the heavy liquid from the separator 5. 10 and 11 are holders below the outlets 8 and 9, respectively, and are adapted to catch the liquid delivered through said outlets. 12 is a second separator having outlets 13 and 14, and 15 and 16 are holders below the outlets 13 and 14, respectively. The light liquid passes from the separator through outlet 13 to holder 15, while the heavy liquid passes to holder 16 from outlet 14.

Extending from the holders 10 and 11 to the holder 2 and the inlet to separator 12 is a pipe line 17, which is provided with valves 19, 20 and 21, as well as a pump 22 between said valves and the tank 2. 23 is a similar pipe connection extending from holders 15 and 16 to holder 2, which is also provided with valves 24 and 25 and a pump 26.

The holders 10, 11, 15 and 16 are provided with valved pipes 27, 28, 29 and 30, respectively, through which the various holders may be drained when desired.

In the foregoing I have illustrated and described an apparatus in which the method may be carried out in several ways, either intermittently or continuously.

In carrying out the method continuously in one manner, the valves 7, 18, 19 and 25 are opened and valves 20, 21 and 24 are closed. The pump 26 and separators 5 and 12 are driven continuously, while the pump 22 is inactive.

When operating the apparatus in this manner for separating oil and water for example, the mixture is first passed through the separator 5, the outlets from the bowl being so adjusted that only pure oil will be delivered to the holder 10 through outlet 8, while water with a percentage of oil will be delivered to holder 11 through outlet 9. As the oil in holder 10 is substantially pure or free of water, no further treatment is necessary, and the oil can be drawn therefrom through outlet 27 as desired. The mixture in holder 11, however, which still contains some oil, is delivered to the separator 12 for further separation. The outlets from the bowl of this separator are adjusted so as to deliver only water to holder 16, and a mixture or emulsion of water and oil to holder 15, which is delivered by the pump 26 to holder 2, and again passed through the system. It may often be possible, and where possible often desirable, when operating under this continuous system, to so adjust the outlets that the mixture delivered to tank 15 shall contain substantially the same proportions of oil and water as are contained in the mixture in holder 2, or that delivered thereto through pipe 3.

If desired, valves 19 and 25 can be closed, valves 20 and 24 opened and the outlets of the separators adjusted to deliver only water to holder 11 and oil and water to holder 10. This mixture from holder 10 is delivered to separator 12 which in turn will deliver oil and water to holder 16 and oil to holder 15, and as the pump 26 is now connected with holder 16, the mixture will be returned to holder 2.

If desired, the process may be carried out with a single separator by what might be termed a batch process. When separating by the batch process, all of the valves with the exception of valve 7 are closed, and the outlets from the bowl of separator 5 are set to deliver only oil to holder 10 and oil and water to holder 11. The process may be continued until holder 11 is filled and at which time holder 2 should be drained. Valve 7 is now closed and valves 19 and 21 are opened. The mixture is then pumped from holder 11 to holder 2 and after holder 11 has been drained the pump is stopped and valves 19 and 21 are closed. The oil in holder 10 from the previous run is drained out through pipe 27 and the valve in the drain pipe is again closed. The outlets from the bowl of the separator are now adjusted so as to deliver only water to holder 11 and oil and water to holder 10.

Separator 5 is again set into motion and valve 7 is opened to deliver the mixture thereto, the water free of oil passing to holder 11, while the mixture of oil and water is delivered to holder 10. After the batch has been separated, the small amount of mixture in holder 10 may be pumped back to holder 2 to be passed through the system with the next batch to be treated.

If desired, in the batch process the outlets from the separator bowl may be so adjusted that in the first step water free of oil will be delivered through the outlet 9, and oil and water through outlet 8, and in the second step oil free of water will be delivered through outlet 8 and oil and water through outlet 9.

The apparatus described is also adapted for carrying out the steps of my process in other ways than those above described.

If it be assumed that two-thirds of the oil is recovered in the first centrifugal operation and two-thirds of the water in the second centrifugal operation, the final emulsion of oil and water that is returned to the supply tank will be of the same composition, with respect both to constituents and proportions, as the original mixture and will aggregate in volume one-third of the mixture that passed to the first centrifuge. It will thus be understood, under the assumed conditions, that two centrifugal operations effect the recovery, in a pure condition, of two-thirds of each constituent, which, in the continuous process, is the equivalent of a complete recovery, in a pure condition, of both constituents, by means of three centrifugal operations.

Having now fully described my invention, what I claim and desire to protect by Letters Patent is:

1. The process of centrifugally separating mixtures and resolving emulsions so as to obtain a substantially quantative recovery in a substantially pure condition of one or more of the constituents, which comprises subjecting the constituents to centrifugal force and so regulating the discharge as to separate a substantial proportion of one constituent in a substantially pure condition from a mixture or emulsion of the other constituent and the remaining portion of the first constituent, and then subjecting the latter mixture or emulsion to centrifugal force and so regulating the discharge as to separate a substantial proportion of the second constituent in a substantially pure condition from the remaining portions of both constituents.

2. The process of centrifugally separating mixtures and resolving emulsions so as to obtain a substantially quantative recovery in a substantially pure condition of one or more of the constituents, which comprises subjecting the constituents to centrifugal force and so regulating the discharge as to separate a substantial proportion of one constituent in a substantially pure condition from a mixture or emulsion of the other constituent and the remaining portion of the first constituent, and then subjecting the latter mixture or emulsion to centrifugal force and so regulating the discharge as to separate a substantial proportion of the second constituent in a substantially pure condition from a mixture or emulsion of the remaining portion of both constituents and subjecting the latter to the same treatment as that to which the original mixture or emulsion is subjected.

3. The process of centrifugally separating mixtures and resolving emulsions so as to obtain a substantially quantitative recovery in a substantially pure condition of one or more of the constituents, which comprises substantially continuously delivering the mixture or emulsion from a body of the same and separating by centrifugal force a substantial proportion of one constituent in a substantially pure condition from a mixture or emulsion of the other constituent and the remaining portion of the first constituent, then separating by centrifugal force from the latter mixture or emulsion a substantial proportion of the second constituent in a substantially pure condition from a mixture or emulsion of the remaining portions of both constituents, and then transferring the last named mixture or emulsion to the above specified body.

4. The process of centrifugally separating mixtures and resolving emulsions so as to obtain a substantially quantative recovery in a substantially pure condition of one or more of the constituents, which comprises separating by centrifugal force a proportion of one constituent in a substantially pure condition from a mixture or emulsion of the other constituent and the remaining portion of the first constituent, and then separating by centrifugal force from the latter mixture or emulsion a substantial proportion of the second constituent in a substantially pure condition from a mixture or emulsion of the remaining portions of both constituents, and so regulating the discharge in each centrifugal operation that the relative proportions of the two constituents in the final mixture or emulsion will approximate those in the original mixture or emulsion.

In testimony of which invention, I have hereunto set my hand, at Philadelphia, Pa., on this 13th day of August, 1921.

JESSE B. HELLER.